(12) United States Patent
Xia et al.

(10) Patent No.: US 12,131,094 B2
(45) Date of Patent: Oct. 29, 2024

(54) SCREEN PROJECTION INTERACTION METHOD, SCREEN PROJECTION SYSTEM AND TERMINAL DEVICE

(71) Applicant: BOE Technology Group Co., Ltd., Beijing (CN)

(72) Inventors: Youxiang Xia, Beijing (CN); Mingyuan Ma, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 126 days.

(21) Appl. No.: 17/431,723

(22) PCT Filed: Nov. 25, 2020

(86) PCT No.: PCT/CN2020/131546
§ 371 (c)(1),
(2) Date: Aug. 18, 2021

(87) PCT Pub. No.: WO2022/109883
PCT Pub. Date: Jun. 2, 2022

(65) Prior Publication Data
US 2023/0139932 A1    May 4, 2023

(51) Int. Cl.
*G06F 3/14* (2006.01)
*G06F 3/04842* (2022.01)
(Continued)

(52) U.S. Cl.
CPC ........ *G06F 3/1454* (2013.01); *G06F 3/04842* (2013.01); *G06F 3/0486* (2013.01); *G06F 3/0488* (2013.01); *H04L 67/1095* (2013.01)

(58) Field of Classification Search
CPC ... G06F 3/14–153; G06F 3/1454–1462; G06F 3/048; G06F 3/04842; G06F 3/0486; G06F 3/0488–04886; H04L 67/1095
See application file for complete search history.

(56) References Cited

U.S. PATENT DOCUMENTS

| 10,761,715 B2* | 9/2020 | Shin ...................... G06F 3/0486 |
| 2010/0017745 A1* | 1/2010 | Kikuchi ................ G06F 3/1454 |
| | | 715/781 |

(Continued)

FOREIGN PATENT DOCUMENTS

| CN | 102549574 A | 7/2012 |
| CN | 108415645 A | 8/2018 |

(Continued)

OTHER PUBLICATIONS

1 Office Action dated Jan. 4, 2024 for Chinese Patent Application No. 202080003015.7 and English Translation.

*Primary Examiner* — Liang Y Li

(74) *Attorney, Agent, or Firm* — Ling Wu; Stephen Yang; Ling and Yang Intellectual Property

(57) ABSTRACT

Provided is a screen projection interaction method, including: displaying a plurality of first objects on a display interface of a first terminal in response to a first operation detected by the first terminal; and generating a first screen projection instruction in response to the screen projection selection operation detected on the display interface of the first terminal. Wherein, the plurality of first objects are configured to indicate a plurality of second terminals which are connected to the first terminal, the projection selection operation is configured to select a target object from the plurality of first objects, and the first projection instruction is configured to instruct a second terminal corresponding to the target object to display projected content.

18 Claims, 6 Drawing Sheets

(51) Int. Cl.
    *G06F 3/0486*     (2013.01)
    *G06F 3/0488*     (2022.01)
    *H04L 67/1095*     (2022.01)

(56) References Cited

U.S. PATENT DOCUMENTS

| | | | |
|---|---|---|---|
| 2011/0078573 A1* | 3/2011 | Ooba | G06F 9/451 |
| | | | 715/733 |
| 2011/0081923 A1 | 4/2011 | Forutanpour et al. | |
| 2011/0163944 A1 | 7/2011 | Bilbrey et al. | |
| 2012/0144347 A1* | 6/2012 | Jo | G06F 3/04817 |
| | | | 345/173 |
| 2012/0191832 A1* | 7/2012 | Kim | H04L 65/403 |
| | | | 709/223 |
| 2013/0027289 A1* | 1/2013 | Choi | H04N 21/4222 |
| | | | 345/156 |
| 2014/0053078 A1* | 2/2014 | Kannan | H04W 4/21 |
| | | | 715/748 |
| 2017/0262247 A1* | 9/2017 | Yoganandan | G06F 3/0482 |
| 2018/0039469 A1* | 2/2018 | Han | G06F 3/0486 |
| 2020/0183525 A1 | 6/2020 | Liu et al. | |
| 2021/0405952 A1 | 12/2021 | Wang et al. | |
| 2022/0004315 A1 | 1/2022 | Zhang et al. | |

FOREIGN PATENT DOCUMENTS

| | | |
|---|---|---|
| CN | 109120970 A | 1/2019 |
| CN | 109660842 A | 4/2019 |
| CN | 110147194 A | 8/2019 |
| CN | 110928511 A | 3/2020 |
| CN | 111061445 A | 4/2020 |
| CN | 111666055 A | 9/2020 |
| CN | 111880757 A | 11/2020 |
| CN | 111988653 A | 11/2020 |
| WO | 2019036942 A1 | 2/2019 |

\* cited by examiner

SCREEN PROJECTION INTERACTION METHOD, SCREEN PROJECTION SYSTEM AND TERMINAL DEVICE

TECHNICAL FIELD

The present disclosure relates to, but is not limited to, the technical field of display, in particular to a screen projection interaction method, a screen projection system and a terminal device.

BACKGROUND

With the continuous development of display technology, screen projection between different terminal devices has grown into a popular way for users. For example, using wireless communication technology, the image of one terminal device (e.g., mobile terminal device such as mobile phone) can be projected to another terminal device (e.g., fixed terminal device such as large display screen) for presentation, and the images displayed by the two terminal devices are synchronized.

SUMMARY

The following is a summary of subject matter described in detail herein. This summary is not intended to limit the protection scope of the claims.

Embodiments of the present disclosure provide a screen projection interaction method, a screen projection system and a terminal device.

In one aspect, an embodiment of the present disclosure provides a screen projection interaction method, which includes the following steps: displaying a plurality of first objects on a display interface of a first terminal in response to a first operation detected by the first terminal, wherein the a plurality of first objects are configured to indicate a plurality of second terminals which are connected to the first terminal; and generating a first screen projection instruction in response to the screen projection selection operation detected on the display interface of the first terminal. Wherein, the screen projection selection operation is configured to select a target object from the plurality of first objects, and the first screen projection instruction is configured to instruct a second terminal corresponding to the target object to display projected content.

In some exemplary embodiments, the screen projection selection operation includes a sliding operation on the display interface or a dragging operation for projected contents on the display interface.

In some exemplary embodiments, generating the first screen projection instruction in response to the screen projection selection operation detected on the display interface of the first terminal includes:
  selecting the first object corresponding to the end position of the sliding operation as the target object when the sliding operation on the display interface ends at the position where one of the first objects is located, and generating a first screen projection instruction;
  or, when the projected content on the display interface moves to the position of one of the first objects following the dragging operation and ends the movement, selecting the first object corresponding to the ending position of the projected content as the target object to generate a first screen projection instruction;
  or, when the projected content on the display interface moves to an end position following the dragging operation, selecting the first object closest to the end position of the projected content as the target object to generate a first screen projection instruction.

In some exemplary embodiments, the aforementioned screen projection interaction method further includes: displaying at least one second object on the display interface of the first terminal in response to a first operation detected by the first terminal;
  or, before displaying a plurality of first objects on the display interface of the first terminal, displaying at least one second object on the display interface in response to a second operation detected on the display interface of the first terminal;
  or, after displaying a plurality of first objects on the display interface of the first terminal, displaying at least one second object on the display interface in response to a third operation detected on the display interface of the first terminal;
  wherein the at least one second object is configured to indicate at least one projected content; the screen projection selection operation includes a dragging operation for the at least one second object.

In some exemplary embodiments, generating the first screen projection instruction in response to the screen projection selection operation detected on the display interface of the first terminal includes:
  when the second object moves to the position of one of the first objects following the dragging operation and ends the movement, selecting the first object corresponding to the end position of the second object as the target object to generate a first screen projection instruction;
  or, selecting the first object closest to the end position of the second object as the target object when the second object moves to the end position following the dragging operation, and generating a first screen projection instruction.

In some exemplary embodiments, the second object includes a floating box, or a thumbnail of projected content.

In some exemplary embodiments, the first operation includes at least one of a first screen projection wake-up gesture of the first terminal, a touch operation at a set position of a display interface of the first terminal, a long-press operation at any position of the display interface of the first terminal, and a touch operation on a second object displayed on the display interface.

In some exemplary embodiments, the plurality of first objects are displayed at set positions of a display interface of the first terminal; or, the display position of at least one first object on the display interface matches the position of the second terminal corresponding to the first object relative to the first terminal.

In some exemplary embodiments, the aforementioned screen projection interaction method further includes: displaying the target object on the display interface of the first terminal in a display manner different from the first objects except the target object in response to the received screen projection success instruction, wherein the screen projection success instruction is configured to indicate that the second terminal corresponding to the target object has successfully displayed the screen projection content.

In some exemplary embodiments, before generating a first screen projection instruction in response to the screen projection selection operation, the method further includes: selecting a recommended terminal from a plurality of second terminals connected to the first terminal according to the attributes of projected content on the display interface, and displaying a first object corresponding to the recommended terminal on the display interface in a display manner different from the first objects corresponding to the second terminals other than the recommended terminal.

In some exemplary embodiments, the aforementioned screen projection interaction method further includes: selecting a target terminal from a plurality of second terminals connected to the first terminal according to the attributes of the projected content on the display interface in response to the fourth operation detected by the first terminal, and generating a second screen projection instruction, which is configured to instruct the target terminal to display the projected content.

In some exemplary embodiments, after a second screen projection instruction is generated, the method further includes: displaying the plurality of first objects for indicating the plurality of second terminals on the display interface, and the display manner of the first objects corresponding to the target terminal is different from the display manner of other first objects.

In some exemplary embodiments, the first terminal and the plurality of second terminals establish communication connection through a cloud server.

In another aspect, the embodiment of the disclosure further provides a screen projection system, including: a first terminal and a plurality of second terminals, wherein the first terminal establishes connections with the plurality of second terminals. The first terminal is configured to display a plurality of first objects on a display interface in response to the detected first operation, and generate a first screen projection instruction in response to the detected screen projection selection operation on the display interface. Wherein, the plurality of first objects are configured to indicate a plurality of second terminals which are connected to the first terminal. The screen projection selection operation is configured to select a target object from the plurality of first objects. The first projection instruction is configured to instruct a second terminal corresponding to the target object to display projected content.

In some exemplary embodiments, the above screen projection system further includes a cloud server, wherein the first terminal establishes communication connection with the plurality of second terminals through the cloud server.

In some exemplary embodiments, at least one second terminal is configured to generate a third screen projection instruction in response to a screen projection operation detected on the second terminal when displaying the projected content of the first terminal, and the third screen projection instruction is configured to instruct another second terminal to display the projected content.

In another aspect, an embodiment of the disclosure further provides a terminal device, which includes a display panel, an input device, a processor and a memory. The display panel is connected to the processor and is adapted to provide a display interface; the input device is connected to the processor and is adapted to detect operations on the terminal device; and the memory is adapted to store a computer program, and when executed by the processor, the steps of the aforementioned screen projection interaction method are implemented.

In another aspect, an embodiment of the present disclosure further provides a computer-readable storage medium, storing a computer program, wherein when the computer program is executed by a processor; steps of the above method for implementing screen projection interaction are performed.

Other aspects will be understood after the drawings and the detailed description are read and understood.

BRIEF DESCRIPTION OF DRAWINGS

Accompanying drawings are used to provide a further understanding of technical solutions of the present disclosure and constitute a part of the specification to explain the technical solutions of the present disclosure together with embodiments of the present disclosure, and do not constitute any limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

Figure 1:
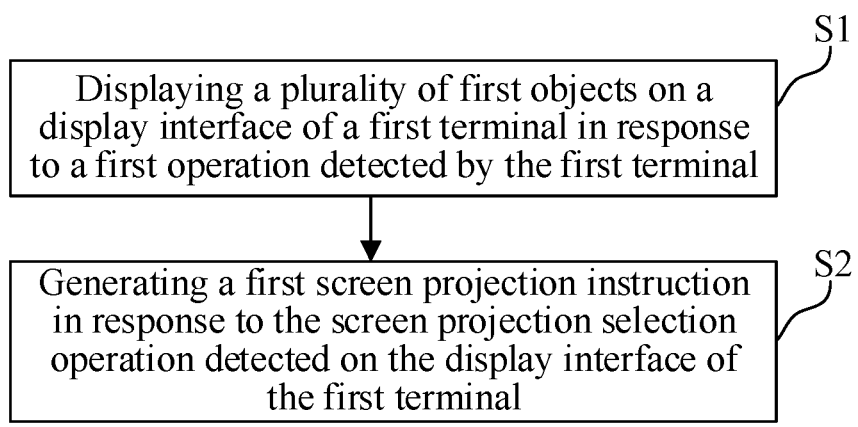
FIG. 1 is a schematic flowchart of a projection interaction method according to at least one embodiment of the present disclosure.

To make the objects, technical solutions and advantages of the present disclosure more clear, embodiments of the present disclosure will be described in detail below with reference to the drawings. The embodiments may be implemented in a number of different forms. Those of ordinary skills in the art will readily understand the fact that implementations and contents may be transformed into one or more of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, size of one or more constituent elements, or thickness or area of a layer, is sometimes exaggerated for clarity. Therefore, an embodiment of the present disclosure is not necessarily limited to the size, and shapes and dimensions of a plurality of components in the drawings do not reflect real scales. In addition, the drawings schematically show ideal examples, and an implementation of the present disclosure is not limited to the shapes or values shown in the drawings.

The "first", "second", "third" and other ordinal numbers in the present disclosure are used to avoid confusion of constituent elements, not to provide any quantitative limitation. In the description of the present disclosure, term "a plurality of" means two or more counts.

In the present disclosure, for the sake of convenience, wordings such as "central", "upper", "lower", "front", "rear", "vertical", "horizontal", "top", "bottom", "inner", "outer" and the others describing the orientations or positional relations are used to depict relations of elements with reference to the drawings, which are only for an easy and simplified description of the present disclosure, rather than for indicating or implying that the device or element referred to must have a specific orientation, or must be constructed and operated in a particular orientation and therefore, those wordings cannot be construed as limitations on the present disclosure. The positional relations of the constituent elements may be appropriately changed according to the direction in which constituent elements are described. Therefore, the wordings are not limited in the specification, and may be replaced appropriately according to situations.

In the present disclosure, the terms "installed", "connected" and "coupled" shall be understood in their broadest sense unless otherwise explicitly specified and defined. For example, a connection may be a fixed connection, or a detachable connection, or an integrated connection; it may be a mechanical connection, or an electrical connection; it may be a direct connection, or an indirect connection through middleware, or an internal connection between two elements. Those of ordinary skills in the art may understand the specific meanings of the above terms in the present disclosure according to situations.

At least one embodiment of the disclosure provides a screen projection interaction method, a screen projection system and a terminal device, which may provide a simple and convenient operation mode with strong interactive interestingness, thereby improving user experience.

FIG. 1 is a flowchart of a projection interaction method according to at least one embodiment of the present disclosure. As shown in FIG. 1, the screen projection interaction method provided by this exemplary embodiment includes the following steps:

S1, displaying a plurality of first objects on a display interface of a first terminal in response to a first operation detected by the first terminal; and S2, generating a first screen projection instruction in response to a screen projection selection operation detected on the display interface of the first terminal.

Wherein, the plurality of first objects are configured to indicate a plurality of second terminals which are connected to the first terminal, the projection selection operation is configured to select a target object from the plurality of first objects, and the first projection instruction is configured to instruct a second terminal corresponding to the target object to display projected content. In some examples, the projected content may include at least one of video files, audio files, pictures, and text files. However, the types of projected content are not limited in the present embodiment.

The screen projection interaction method of this exemplary embodiment is executed by the first terminal. In some examples, the first terminal may be a portable terminal device such as a smart phone or a tablet computer, or a fixed terminal device such as a desktop computer. However, this is not limited in the embodiment of the present disclosure.

In this exemplary embodiment, the first terminal establishes connections with a plurality of second terminals. In some examples, the plurality of second terminals may be portable terminal devices such as smart phones and tablet computers, fixed terminal devices such as desktop computers, or display devices such as large display screens. For example, the first terminal may be a smart phone, and the plurality of second terminals may be display devices such as tablet computers and desktop computers, and the display screen size of the second terminals is larger than that of the first terminals. However, this is not limited in the present embodiment.

In some exemplary embodiments, the first terminal establishes a connection with the plurality of second terminals in a wired manner (e.g., a signal line) for the communication to be achieved between the first terminal and the plurality of second terminals. Or, the first terminal establishes a connection with a plurality of second terminals in a wireless connection manner (e.g., WIFI or Bluetooth) for the communication to be achieved between the first terminal and the plurality of second terminals. However, this is not limited in the present embodiment.

In some exemplary embodiments, the first terminal establishes communication connection with the plurality of second terminals through the cloud server. For example, the cloud server may allocate a first storage space to the first terminal and a second storage space to each second terminal, and construct a shared storage space. The data of the first terminal may be stored in a first storage space, and the data of a second terminal may be stored in a corresponding second storage space. The first terminal may access the first storage space and shared storage space, and the second terminal may access its own second storage space and shared storage space. In some examples, when a first terminal generates a first screen projection instruction, the projected content stored in the first storage space and needs to be displayed by the selected second terminal may be transferred to the shared storage space of the cloud server. The first terminal may send a first screen projection instruction to the selected second terminal through the cloud server, and the first screen projection instruction may carry authorization information; after receiving the first screen projection instruction, the corresponding second terminal may obtain authorization information by analyzing the first screen projection instruction, and may read the projected content from the shared storage space of the cloud server by using the authorization information and display the read projected content. By displaying the projected content, the second terminal and the first terminal may achieve picture synchronization, or the second terminal may independently display the files selected on the first terminal. In some examples, the second terminal may only display the projected content, and does not have the modification authority. Or, in some examples, the second terminal has the authority to display and modify the projected content, and the modified projected content may be stored in the shared storage space of the cloud server, thereby improving the data security in the screen projection process. However, this is not limited in the present embodiment.

In some exemplary embodiments, a projection selection operation includes a sliding operation on a display interface, or a dragging operation for projected contents on the display interface. For example, the entire display interface of the first terminal may be projected to the second terminal corresponding to the target object, or some contents (such as partial pictures or files displayed on the display interface) may be selected from the display interface of the first terminal as projected contents and projected to the second terminal corresponding to the target object. However, this is not limited in the present embodiment.

In some exemplary embodiments, generating of a first screen projection instruction in response to the screen projection selection operation detected on the display interface of the first terminal, includes: selecting a first object corresponding to an end position of the sliding operation as a target object when the sliding operation on a display interface ends at the position where one of the first objects is located, and generating a first screen projection instruction; or, when the projected content on the display interface moves to the position of one of the first objects following the dragging operation and ends the movement, selecting a first object corresponding to the ending position of the projected content as a target object to generate a first screen projection instruction; or, when the projected content on the display interface moves to an end position following the dragging operation, selecting the first object closest to the end position of the projected content as a target object to generate a first screen projection instruction. In this exemplary embodiment, the second terminal for screen projection may be selected according to the end position of sliding operation on the display interface or the end position of dragging operation on projected content. The sliding operation and dragging operation provided by this exemplary embodiment are simple and convenient, and may enhance the interestingness of human-computer interaction, thereby improving the user experience.

In some exemplary embodiments, the screen projection interaction method according to the present embodiment may further include: displaying at least one second object on a display interface of a first terminal in response to a first operation detected by the first terminal; or, before displaying a plurality of first objects on the display interface of the first terminal, displaying at least one second object on the display interface in response to a second operation detected on the display interface of the first terminal; or, after displaying a plurality of first objects on the display interface of the first terminal, displaying at least one second object on the display interface in response to a third operation detected on the display interface of the first terminal; wherein the at least one second object is configured to indicate the projected content, and the screen selection operation includes a dragging operation used for at least one second object. In this exemplary embodiment, at least one second object is displayed on the display interface to assist the projection selection operation, which enhances the interestingness of human-computer interaction.

In some exemplary embodiments, generating of a first screen projection instruction in response to the screen projection selection operation detected on the display interface of the first terminal, includes: when a second object moves to a position where one of the first objects is located following a dragging operation and ends the movement, selecting a first object corresponding to an end position of the second object as a target object to generate a first screen projection instruction; or, selecting a first object closest to an end position of the second object as the target object when the second object moves to the end position following the dragging operation, and generating a first screen projection instruction. The dragging operation for the second object provided by this exemplary embodiment is simple and convenient, and may enhance the interestingness of human-computer interaction, thereby improving the user experience.

In some examples, a plurality of second objects may be configured to indicate different projected contents on the display interface of the first terminal. For example, when the displayed content of the entire display interface is taken as the projected content, one second object may be displayed, and the target object may be selected by dragging the second object to perform the screen projection display of the whole screen of the first terminal. When there are different projection requirements for different displayed contents on the entire display interface, a plurality of second objects may be displayed, and one second object is configured to indicate a projected content (for example, a picture or a file displayed on the display interface). By dragging the second objects to the corresponding first objects respectively, a plurality of projected contents of the first terminal may be projected to different second terminals. In this exemplary embodiment, by displaying at least one second object on the display interface, simple and convenient screen selection operation may be supported, and the interestingness of human-computer interaction may be enhanced, thereby improving the user experience.

In some exemplary embodiments, a second object includes a floating box, or a thumbnail of projected content. However, the display manner of the second object is not limited in the embodiment of the present disclosure. For example, the second object may be an icon, a character, or the like for indicating the projected content.

In some exemplary embodiments, a first operation includes at least one of a first screen projection wake-up gesture of a first terminal, a touch operation at a set position of a display interface of the first terminal, a long-press operation at any position of the display interface of the first terminal, and a touch operation on a second object displayed on the display interface. In some examples, touch operation may include one of the following: a single click operation, a double click operation, and a long-press operation. For example, a plurality of first objects and a second object are displayed on the display interface of the first terminal in response to a first wake-up gesture on the first terminal; or, a plurality of first objects and one second object are displayed on the display interface of the first terminal in response to a long-press operation at any position of the display interface of the first terminal. However, this is not limited in the present embodiment.

In some exemplary embodiments, a plurality of first objects are displayed at set positions of a display interface of a first terminal; or, the display position of at least one first object on the display interface matches a position of a second terminal corresponding to the first object relative to the first terminal. In some examples, a plurality of first objects are displayed at fixed positions of the display interface (e.g., at edges of both sides if the display interface). Or, the display positions of the plurality of first objects on the display interface may be configured to indicate the relative positional relationship between the plurality of second terminals and the first terminals. However, this is not limited in the present embodiment.

In some exemplary embodiments, the screen projection interaction method according to the present embodiment may further include: displaying a target object on the display interface of a first terminal in a display manner different from the display manner of the first object except the target object in response to the received screen projection success instruction, wherein a screen projection success instruction is configured to indicate that the second terminal corresponding to the target object has successfully displayed the screen projection content. In other words, after the second terminal corresponding to the target object displays the projected content, the second terminal corresponding to the target object will send a screen projection success instruction to the first terminal, and the first terminal will update and display a plurality of first objects after receiving the screen projection success instruction. On a display interface of the first terminal, the display manner of the first object corresponding to the second terminal performing screen projection is different from the display manner of the first object corresponding to the second terminal not performing screen projection. In some examples, after the first terminal selects the target object and the second terminal corresponding to the target object performs screen projection display, the first terminal may perform special display on the target object (for example, change the display color of the target object, change the fill pattern of the target object, add a new text identifier to the target object, etc.) to indicate that the second terminal corresponding to the first object is performing screen projection or has performed screen projection display before. Or, a thumbnail of the screen currently being projected is displayed on the target object, so that the user may know the content being projected on the corresponding second terminal. In this exemplary embodiment, the target object is specially displayed, which is convenient for the user to know the real-time status of screen projection and can improve the user experience.

In some exemplary embodiments, before generating a first screen projection instruction in response to the screen projection selection operation, the screen projection interaction method of this embodiment may further include: selecting a recommended terminal from a plurality of second terminals connected to a first terminal according to the attributes of projected content on a display interface, and displaying a first object corresponding to the recommended terminal on the display interface in a display manner different from the display manner of a first object corresponding to the second terminal other than the recommended terminal. In other words, after the first terminal selects the recommended terminal for screen projection through automatic matching, the display manner of the first object corresponding to the recommended terminal is different from the display manner of the first objects corresponding to other second terminals on the display interface of the first terminal. In some examples, after a plurality of first objects are displayed on the display interface of the first terminal, the first terminal may automatically match the projected content to select a suitable second terminal as a recommended terminal, and indicate it to the user through a first object on the display interface for the user to select the target terminal after reference. Or, in some examples, the first terminal automatically matches the projected content in response to the first operation on the first terminal to select the recommended terminal, and displays a plurality of first objects on the display interface. The display manner of the first object corresponding to the recommended terminal is different from the display manner of the first objects corresponding to other second terminals. In this exemplary embodiment, by indicating a recommended terminal on the display interface to the user, it is helpful for the user to select a suitable second terminal for screen projection, thereby improving the user experience.

In some exemplary embodiments, the screen projection interaction method according to the present embodiment may further include: selecting a target terminal from a plurality of second terminals connected to a first terminal according to the attributes of the projected content on a display interface in response to a fourth operation detected by the first terminal, and generating a second screen projection instruction, which is configured to instruct the target terminal to display the projected content. Wherein, the fourth operation is different from the first operation. For example, a first terminal enters a manual screen projection mode in response to a first operation, and the first terminal enters the automatic screen projection mode in response to the fourth operation. In some examples, a fourth operation may include at least one of the following: a second screen projection wake-up gesture at the first terminal, and a long-press operation at a set position of the display interface of the first terminal. The second wake-up gesture is different from the first wake-up gesture. However, this is not limited in the present embodiment.

In some exemplary embodiments, after a second screen projection instruction is generated, the screen projection interaction method according to the present embodiment may further include: displaying a plurality of first objects for indicating a plurality of second terminals on a display interface, and the display manner of the first objects corresponding to a target terminal is different from the display manner of other first objects. In this exemplary embodiment, after the first terminal enters the automatic screen projection mode, a plurality of first objects may be displayed on the display interface of the first terminal, and the plurality of first objects are configured to indicate a plurality of second terminals connected to the first terminal, wherein the display manner of the first object corresponding to the selected target terminal through automatic matching is different from the display manner of other first objects. For example, the first object corresponding to the target terminal may be displayed in a special way (for example, the first object corresponding to the target object may be filled with color, pattern or added with character identification, etc.), and other first objects may be displayed in the same way. Or, the thumbnail of the screen currently being projected is displayed on the first object corresponding to the target terminal, so that the user may know the content being projected on the corresponding second terminal. However, this is not limited in the present embodiment. In some examples, after the first terminal enters the automatic screen projection mode, the first object may not be displayed on the display interface of the first terminal, or only the first object corresponding to the target terminal may be displayed.

Here, the screen projection interaction method of the first terminal will be illustrated below through a number of examples. In the following exemplary embodiment, the communication connection between the first terminal and two second terminals A and B is taken as an example. For example, the first terminal is a mobile phone, the second terminal A is a tablet computer, and the second terminal B is a desktop computer. However, this is not limited in the present embodiment.

Figure 2:
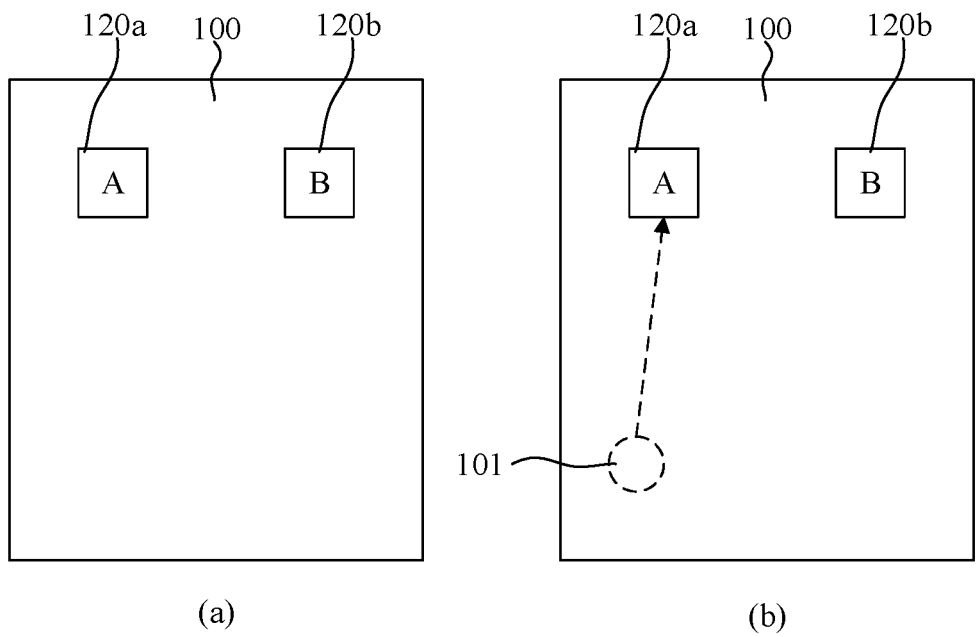
FIG. 2 is a schematic diagram of a display interface of a screen projection interaction method according to at least one embodiment of the present disclosure.

FIG. 2 is a schematic diagram of a display interface of a screen projection interaction method according to at least one embodiment of the present disclosure. In some exemplary embodiments, as shown in FIG. 2(a), a plurality of first objects, such as two first objects 120a and 120b, are displayed on the display interface 100 of the first terminal, in response to the detected first operation. The first object 120a is configured to indicate a second terminal A that establishes a connection with the first terminal, and the first object 120b is configured to indicate a second terminal B that establishes a connection with the first terminal. The first objects 120a and 120*b* are independent of each other, for example, located in different regions of the display interface 100. In this example, the two first objects 120*a* and 120*b* may be task boxes popped up on the display interface 100. In some examples, the name of the corresponding second terminal may be displayed in the task box. For example, the first object 120*a* displays the name "A" of the second terminal A, and the first object 120*b* displays the name "B" of the second terminal B. However, this is not limited in the present embodiment. For example, the thumbnail of the corresponding second terminal may be displayed in the task box. Or, in some examples, the first object may be an icon corresponding to the second terminal; for example, if the second terminal is a tablet computer, the corresponding first object may be a thumbnail of the tablet computer, if the second terminal is a desktop computer, and the corresponding first object may be a thumbnail of the desktop computer.

In some examples, the first objects 120*a* and 120*b* may be rectangular. However, this is not limited in the present embodiment. In some examples, the first objects 120*a* and 120*b* may be circular or heart-shaped, etc. In some examples, the shapes of the plurality of first objects may be the same or different.

In some examples, the first objects 120*a* and 120*b* may only cover the original displayed content corresponding to the display position. However, this is not limited in the present embodiment. For example, the original displayed content of the entire display interface may be blocked, and only a plurality of first objects are displayed on the display interface.

In some examples, the display positions of the two first objects 120*a* and 120*b* on the display interface 100 matches the positions of the corresponding two second terminals A and B relative to the first terminal. In other words, the display position of any first object on the display interface may reflect the position of the corresponding second terminal relative to the first terminal. For example, taking the center position of the display interface as the origin, the position of any first object relative to the origin matches the position of the second terminal corresponding to the first object relative to the first terminal. As shown in FIG. 2(*a*), the first object 120*a* is located in the upper left of the screen of the display interface 100, and the first object 120*b* is located in the upper right of the screen of the display interface 100. It may be seen that the second terminal A corresponding to the first object 120*a* is located on the left side of the first terminal, the second terminal B corresponding to the first object 120*b* is located on the right side of the first terminal, and both second terminals A and B are located in front of the first terminal. However, this is not limited in the present embodiment. In some examples, a plurality of first objects may be regularly arranged in the middle region of the display interface, and the arrangement order of the first objects may be determined according to the distance between the corresponding second terminals and the first terminals, or the arrangement order of the first objects may be determined according to the order of establishing connection between the corresponding second terminals and the first terminals.

In some examples, the first operation may include at least one of the following: a first screen projection wake-up gesture, a touch operation on a set position of the display interface, a long-press operation on any position of the display interface, and a touch operation on a set icon (e.g., a screen projection command icon) displayed on the display interface. For example, the touch operation may include one of the following: a click operation, a double click operation, and a long-press operation. For example, if the camera of the first terminal recognizes the first screen projection wake-up gesture, a plurality of first objects (for example, task boxes) will pop up on the display interface of the first terminal, or if the first terminal detects a long-press operation at any position on the display interface, a plurality of first objects will pop up on the display interface of the first terminal. However, this is not limited in the present embodiment.

In this example, the screen projection selection operation includes a sliding operation on the display interface 100. As shown in FIG. 2(*b*), after the first objects 120*a* and 120*b* are displayed on the display interface 100, a finger may touch the first position 101 and slide from the first position 101 to the first object 120*a* until reach the first object 120*a*. The first position 101 may be any position on the display interface 100. Or, the first location 101 may be the location where the projected content is located on the display interface 100, for example, the picture corresponding to the first location 101 may be taken as the projected content. Or, the file content indicated by the file icon corresponding to the first location 101 may be taken as the projected content, or it may be the location touched by the finger on the screen when the user performs the first operation. In some examples, the touch screen position where the user applies the first operation and the starting position of the sliding operation may coincide. For example, a long-press operation at any position of the display interface is a first operation, and a plurality of first objects pop up on the display interface of the first terminal, and the user continues to perform the sliding operation at the current position of the long-press operation on the screen as the screen selection operation. In some examples, the end position of the sliding operation may be located within the first object 120*a*, or close to the first object 120*a*. The sliding operation shown in FIG. 2(*b*) may trigger the first terminal to generate a first screen projection instruction, which is configured to instruct the second terminal A corresponding to the first object 120*a* to display the projected content. For example, the displayed content of the entire display interface of the first terminal is projected on the second terminal A, so that the first terminal and the second terminal A achieve synchronous display. Or, the second terminal A projects the displayed content on the entire display interface of the first terminal except for a plurality of first objects, that is, the a plurality of first objects are only displayed on the first terminal, not synchronously on the second terminal A. Or, the second terminal A projects the partial related content on the display interface of the first terminal, for example, a folder is displayed on the display interface of the first terminal, and the second terminal A displays the content after opening the folder. In some examples, when the second terminal B needs to be selected for screen projection, the finger may slide from the first position 101 to the first object 120*b* until it reaches the first object 120*b*.

In some examples, after the second terminal A displays the projected content of the first terminal, the first object 120*a* is displayed on the display interface of the first terminal in a different display manner from the first object 120*b*. In other words, the first object corresponding to the second terminal performing screen projection is specially displayed. For example, putting the text displayed on the first object 120*a* in bold; or, adding text information for explaining that the second terminal corresponding to the first object 120*a* is performing screen projection to the first object 120*a*; or, filling the first object 120*a* with a set color or pattern; or, displaying a thumbnail of the pushed screen content in the first object 120*a*. However, this is not limited in the present embodiment. By specially displaying the first object corresponding to the second terminal that is being projected or has been projected, it is convenient for the user to know the real-time usage of the second terminal, which improves the user experience.

In this example, the first terminal may enter the manual screen projection mode after responding to the first operation. The projected second terminal is selected through sliding operation on the display interface, which achieves screen projection display to the corresponding second terminal. The screen projection selection operation of this exemplary embodiment is simple and convenient, and may enhance the interestingness of human-computer interaction.

Figure 3:
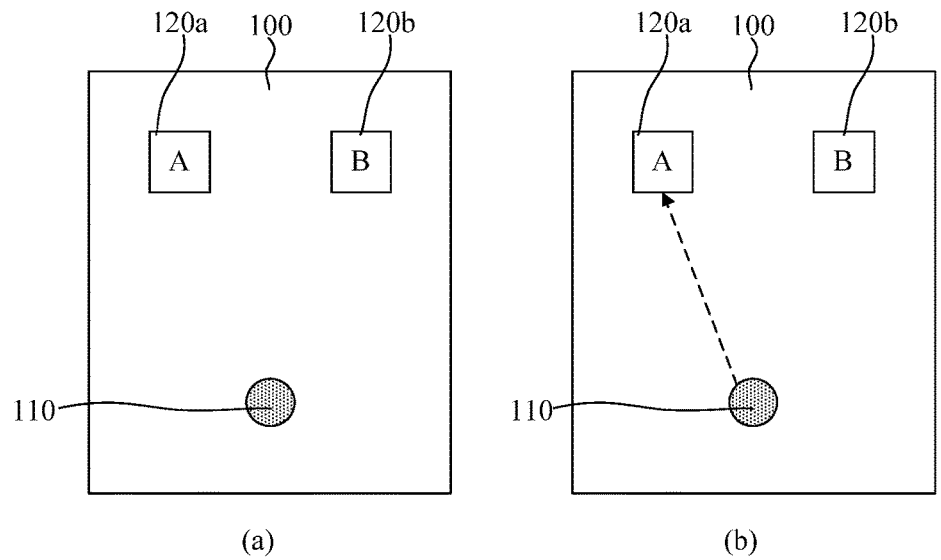
FIG. 3 is a schematic diagram of another display interface of a screen projection interaction method according to at least one embodiment of the present disclosure.

FIG. 3 is a schematic diagram of another display interface of a screen projection interaction method according to at least one embodiment of the present disclosure. In some exemplary embodiments, as shown in FIG. 3(a), a plurality of first objects, such as two first objects 120a and 120b, and a second object 110 are displayed on the display interface 100 in response to the detected first operation. The first object 120a is configured to indicate a second terminal A that establishes a connection with the first terminal, and the first object 120b is configured to indicate a second terminal B that establishes a connection with the first terminal. The first objects 120a and 120b and a second object 110 are independent from each other, for example, the first objects 120a and 120b and the second object 110 are respectively located in different regions of the display interface 100. In this example, the two first objects 120a and 120b may be task boxes popped up on the display interface 100, and the second object 110 may be a draggable floating box. The name of the corresponding second terminal may be displayed in the task box. For example, the first object 120a displays the name "A" of the second terminal A, and the first object 120b displays the name "B" of the second terminal B. However, this is not limited in the present embodiment.

In some examples, the display position of the second object 110 may be determined according to the touch position corresponding to the first operation. For example, when a first operation is a long-press operation on any position of the display interface, the display position of the second object (for example, a floating box) is the touch position of the long-press operation. However, this is not limited in the present embodiment. For example, the second object may be displayed at any position on the display interface in response to the first operation.

In this example, the screen projection selection operation includes a dragging operation for the second object. As shown in FIG. 3(b), after the first objects 120a and 120b and the second object 110 are displayed on the display interface 100, the finger may drag the second object 110 to move toward the first object 120a, until it reaches the first object 120a. The end position of the finger dragging operation may be located within the first object 120a or close to the first object 120a. The dragging operation shown in FIG. 3(b) may trigger the first terminal to generate a first screen projection instruction, which is configured to instruct the second terminal A corresponding to the first object 120a to display the projected content of the first terminal. In some examples, when the second terminal B needs to be selected for screen projection, the finger may drag the second object 110 to move toward the first object 120b until it reaches the first object 120b. However, this is not limited in the present embodiment.

In this example, the first terminal may enter the manual screen projection mode after responding to the first operation. The projected second terminal is selected by dragging the second object on the display interface, which achieves screen projection display to the corresponding second terminal.

For other aspects of the screen projection interaction method of this embodiment, reference may be made to the description of the embodiment shown in FIG. 2, which hence will not be repeated here.

Figure 4:
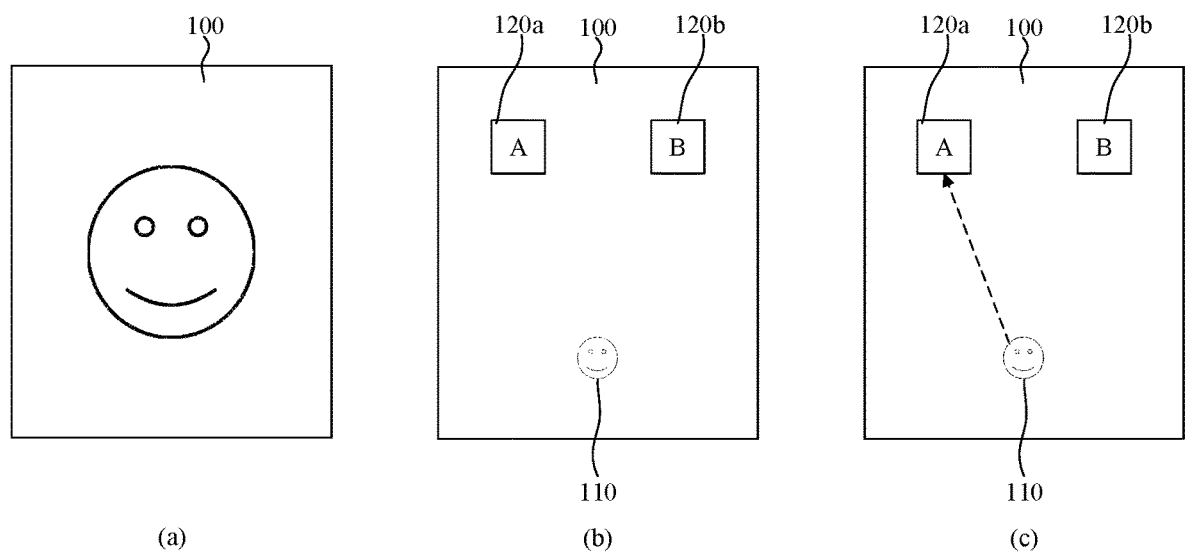
FIG. 4 is a schematic diagram of another display interface of a screen projection interaction method according to at least one embodiment of the present disclosure.

FIG. 4 is a schematic diagram of another display interface of a screen projection interaction method according to at least one embodiment of the present disclosure. In some exemplary embodiments, as shown in FIG. 4(a), the original picture displayed by the display interface 100 of the first terminal is a smiling face. As shown in FIG. 4(b), the first terminal displays a plurality of first objects (for example, two first objects 120a and 120b) and a second object 110 on the display interface 100 in response to the detected first operation. The first object 120a is configured to indicate a second terminal A that establishes a connection with the first terminal, and the first object 120b is configured to indicate a second terminal B that establishes a connection with the first terminal. The two first objects 120a and 120b may be task boxes popped up on the display interface 100. The second object 110 is a thumbnail of the original picture. The first objects 120a and 120b and the second object 110 are independent from each other, for example, they are located in different regions of the display interface 100. Optionally, in the case where the content to be projected is a video, the second object 110 may be a thumbnail of the played interface of the video to be projected when the first operation occurs, or a thumbnail video with reduced size of the interface to be screened in real time, or may be content representing relevant information of the video to be projected. However, this is not limited in the present embodiment.

In some examples, the first operation may be a dragging operation of the original picture on the display interface. The finger may drag the original picture on the display interface 100 shown in FIG. 4(a), and as the dragging operation moves, the original picture gradually shrinks until the thumbnail is displayed, and the first objects 120a and 120b (for example, two task boxes) pop up. However, this is not limited in the present embodiment. For example, the first operation may be a long-press operation on the original picture on the display interface. When the finger holds the original picture, with the increase of touch time, the original picture gradually shrinks until the thumbnail is displayed, and two task boxes pop up. Or, the first operation may be a double-click operation on the original picture. When a finger double-clicks on the original picture, a thumbnail of the original picture may be displayed in a floating way above the original picture, with two task boxes popped up.

In this example, the screen selection operation includes a dragging operation for the second object. As shown in FIG. 4(c), after the first objects 120a and 120b and the second object 110 are displayed on the display interface 100, the finger may drag the second object 110 to move toward the first object 120a, until it reaches the first object 120a. The dragging operation shown in FIG. 4(c) may trigger the first terminal to generate a first screen projection instruction, which is configured to instruct the second terminal A corresponding to the first object 120a to display the projected content of the first terminal (i.e., the original picture on the display interface). In some examples, when the second terminal B needs to be selected for screen projection, the finger may drag the second object 110 to move toward the first object 120b until it reaches the first object 120b. However, this is not limited in the present embodiment.

In this example, the first terminal may enter the manual screen projection mode in response to the first operation. The projected second terminal is selected by dragging the thumbnail of the projected content on the display interface, which achieves screen projection display to the corresponding second terminal.

For other aspects of the display interface of this embodiment, reference may be made to the embodiment shown in FIG. 2, which hence will not be repeated here.

Figure 5:
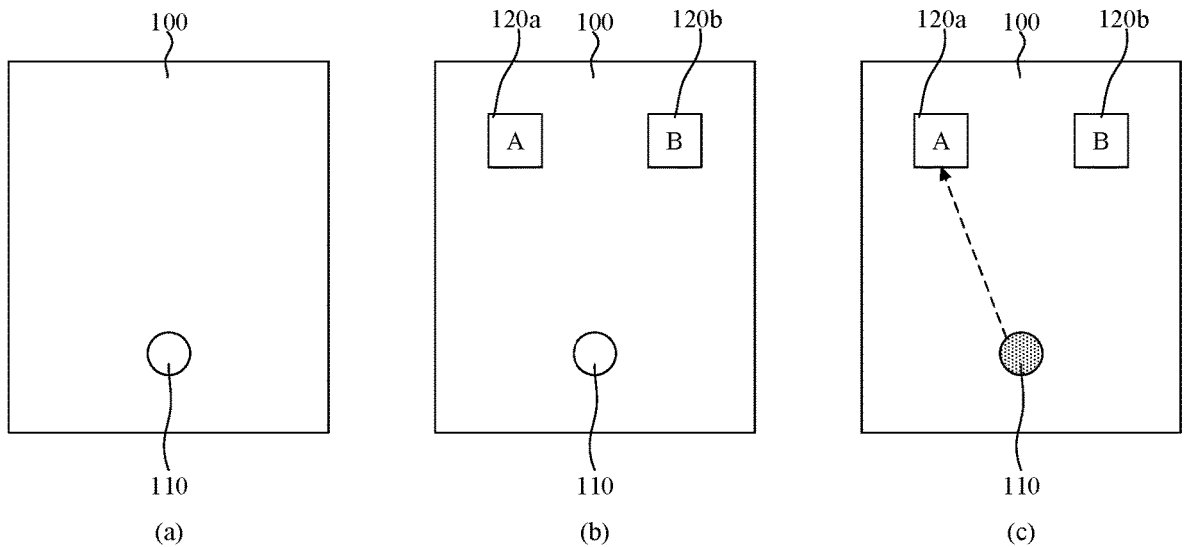
FIG. 5 is a schematic diagram of another display interface of a screen projection interaction method according to at least one embodiment of the present disclosure.

FIG. 5 is a schematic diagram of another display interface of a screen projection interaction method according to at least one embodiment of the present disclosure. In some exemplary embodiments, as shown in FIG. 5(a), the first terminal displays a second object 110 on the display interface 100 in response to the detected second operation. The second operation may include one of the following: a first screen projection wake-up gesture, a touch operation on a set position of the display interface, a long-press operation on any position of the display interface, and a touch operation on a set icon (e.g., a screen projection command icon) on the display interface. For example, the touch operation may include one of the following: a click operation, a double click operation, and a long-press operation. For example, if the first terminal detects a long-press operation for a file on the display interface, the second object is displayed at the position where the long-press operation is located, and the second object is configured to indicate that the projected content is the file targeted by the long-press operation. However, this is not limited in the present embodiment. In some examples, the first terminal enters the manual screen projection mode after detecting the first screen projection wake-up gesture, and the finger may double-click the contents to be projected on the display interface in order to display a plurality of second objects on the display interface, and each second object is configured to indicate one screen projection content.

As shown in FIG. 5(b), the first terminal displays a plurality of first objects on the display interface 100 in response to the detected first operation, such as two first objects 120a and 120b. The first object 120a is configured to indicate a second terminal A that establishes a connection with the first terminal, and the first object 120b is configured to indicate a second terminal B that establishes a connection with the first terminal. The first objects 120a and 120b and a second object 110 are independent from each other, for example, the first objects 120a and 120b and the second object 110 are respectively located in different regions of the display interface 100. In this example, the two first objects 120a and 120b may be task boxes popped up on the display interface 100. In some examples, a first operation includes a touch operation on the second object 110. For example, the touch operation may include one of the following: a click operation, a double click operation, and a long-press operation.

In this example, the screen selection operation includes a dragging operation for the second object. As shown in FIG. 5(c), after the first objects 120a and 120b and the second object 110 are displayed on the display interface 100, the finger may drag the second object 110 to move toward the first object 120a, until the finger reaches the first object 120a. The dragging operation shown in FIG. 5(c) may trigger the first terminal to generate a first screen projection instruction, which is configured to instruct the second terminal A corresponding to the first object 120a to display the projected content of the first terminal. However, this is not limited in the present embodiment.

In this example, a first terminal displays a second object after responding to the second operation, and the first terminal may enter the manual screen projection mode. A plurality of first objects are displayed in response to the first operation, and the projected second terminal is selected by dragging the second object on the display interface, so as to achieve screen projection display to the corresponding second terminal.

For other aspects of the screen projection interaction method of this embodiment, reference may be made to the description of the embodiment shown in FIG. 2, which hence will not be repeated here.

Figure 6:
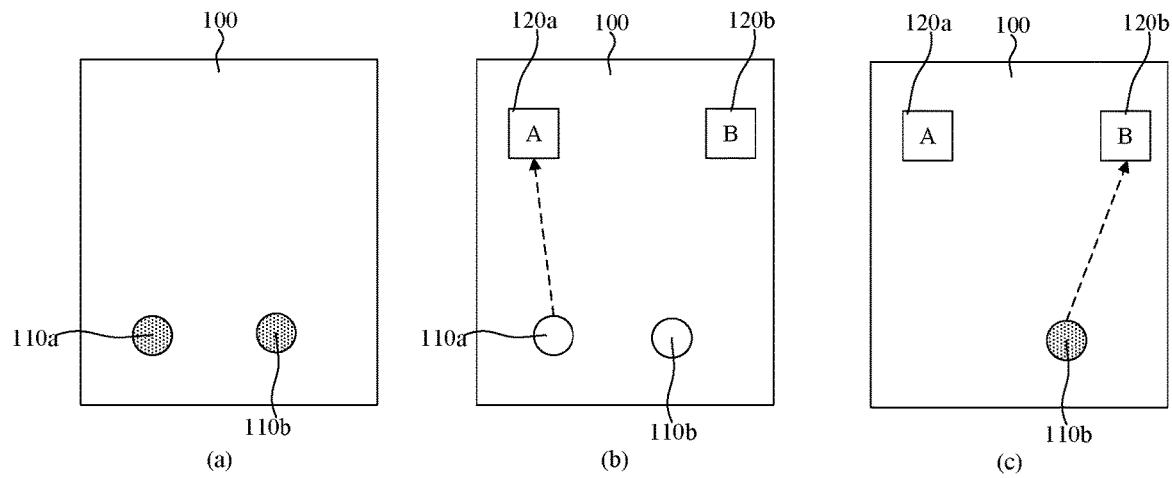
FIG. 6 is a schematic diagram of another display interface of a screen projection interaction method according to at least one embodiment of the present disclosure.

FIG. 6 is a schematic diagram of another display interface of a screen projection interaction method according to at least one embodiment of the present disclosure. In some exemplary embodiments, as shown in FIG. 6(a), when a plurality of projected contents are displayed on the first terminal, a plurality of second objects, such as two second objects 110a and 110b, are displayed on the display interface 100 in response to the detected second operation. A plurality of second objects respectively represent a plurality of corresponding projected contents, for example, the second objects 110a and 110b respectively represent two projected contents on the display interface 100.

As shown in FIG. 6(b), the first terminal displays a plurality of first objects, such as two first objects 120a and 120b, on the display interface 100 in response to the detected first operation. The first object 120a is configured to indicate a second terminal A that establishes a communication connection with the first terminal, and the first object 120b is configured to indicate a second terminal B that establishes a communication connection with the first terminal. Two first objects 120a and 120b and two second objects 110a and 110b are independent from each other, for example, the first objects 120a and 120b and the second objects 110a and 110b are respectively located in different regions of the display interface 100. In this example, the two first objects 120a and 120b may be task boxes popped up on the display interface 100. In this example, the quantities of first objects and second objects displayed on the display interface are the same. However, this is not limited in the present embodiment. For example, the quantity of the second objects displayed on the display interface may be less than the quantity of the first objects, so as to support the projected contents indicated by a plurality of second objects to be displayed on different second terminals.

In this example, the screen projection selection operation includes a dragging operation for the second object. As shown in FIG. 6(b), the finger may drag the second object 110a to move toward the first object 120a until it reaches the first object 120a. The dragging operation shown in FIG. 6(b) may trigger the second terminal A corresponding to the first object 120a to display the projected content indicated by the second object 110a. In this example, after the finger drags the second object 110a to the first object 120a, the second object 110a may no longer be displayed on the display interface 100. However, this is not limited in the present embodiment. For example, after the finger drags the second object to the corresponding first object, the second object may continue to be displayed at the end position of the dragging operation. Or, the second object continues to be displayed at the start position of the dragging operation, or the second object continues to be displayed at a set position of the display interface. In addition, in some examples, in response to the received projection success instruction, the second object corresponding to the successfully projected content may no longer be displayed on the display interface of the first terminal, wherein the screen projection success instruction is configured to indicate that the second terminal corresponding to the selected first object has successfully displayed the projected content indicated by the second object.

In this example, after the second terminal A corresponding to the first object 120a displays the projected content indicated by the second object 110a, as shown in FIG. 6(c), the finger may drag the second object 110b to move toward the first object 120b until it reaches the first object 120b. The dragging operation shown in FIG. 6(c) may trigger the second terminal B corresponding to the first object 120b to display the projected content indicated by the second object 110b. In the same way, after the finger drags the second object 110b to the first object 120b, the second object 110b may no longer be displayed on the display interface 100, or the second object 110b may continue to be displayed.

In this example, a plurality of second objects are displayed on the display interface, which respectively represent a plurality of corresponding projected contents. A finger may drag each second object to any one of the plurality of first objects in turn, so that different projected contents may be displayed on different second terminals, thus achieving personalized projection display of different projected contents.

For other aspects of the screen projection interaction method of this embodiment, reference may be made to the description of the embodiment shown in FIG. 5, which hence will not be repeated here.

Figure 7:
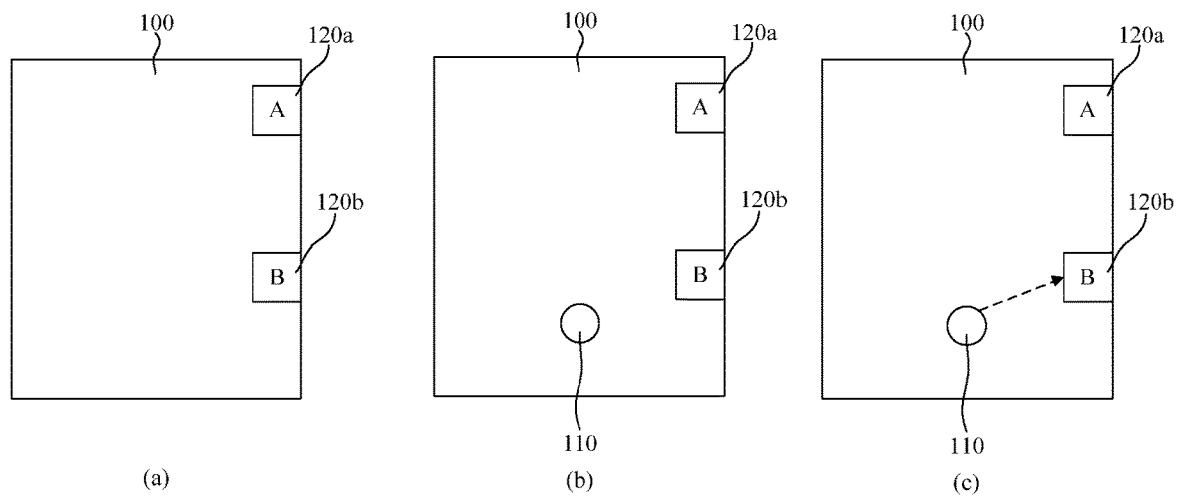
FIG. 7 is a schematic diagram of another display interface of a screen projection interaction method according to at least one embodiment of the present disclosure.

FIG. 7 is a schematic diagram of another display interface of a screen projection interaction method according to at least one embodiment of the present disclosure. In some exemplary embodiments, as shown in FIG. 7(a), a plurality of first objects, such as two first objects 120a and 120b, are displayed on the display interface 100 in response to the detected first operation. The first object 120a is configured to indicate a second terminal A that establishes a connection with the first terminal, and the first object 120b is configured to indicate a second terminal B that establishes a connection with the first terminal. The first objects 120a and 120b are independent from each other, for example, located in different regions of the display interface 100. In this example, the two first objects 120a and 120b may be task boxes popped up on the display interface 100. Two first objects 120a and 120b are sequentially arranged in the edge region on the right side of the display interface 100. However, this is not limited in the present embodiment. In this example, a plurality of first objects may be displayed in a fixed region (e.g., the edge region on the right side) of the display interface.

In some examples, as shown in FIG. 7(b), after the first objects 120a and 120b are displayed on the display interface 100, the first terminal displays the second object 110 on the display interface 100 in response to the detected third operation. The third operation may include one of the following: a touch operation on a set position of the display interface, and a long-press operation on any position of the display interface. For example, the touch operation may include one of the following: a click operation, a double click operation, and a long-press operation. However, this is not limited in the present embodiment.

In this example, the screen selection operation includes a dragging operation for the second object. As shown in FIG. 7(c), after the first objects 120a and 120b and the second object 110 are displayed on the display interface 100, the finger may drag the second object 110 to move toward the first object 120b, until reaching the first object 120b. The dragging operation shown in FIG. 7(c) may trigger the first terminal to generate a first screen projection instruction, which is configured to instruct the second terminal B corresponding to the first object 120b to display the projected content of the first terminal.

In this example, the first terminal may enter the manual screen projection mode in response to the first operation and display the second object in response to the third operation. And the projected second terminal is selected by dragging the second object on the display interface, so as to achieve screen projection display to the corresponding second terminal.

For other aspects of the screen projection interaction method of this embodiment, reference may be made to the description of the embodiment shown in FIG. 2, which hence will not be repeated here.

Figure 8:
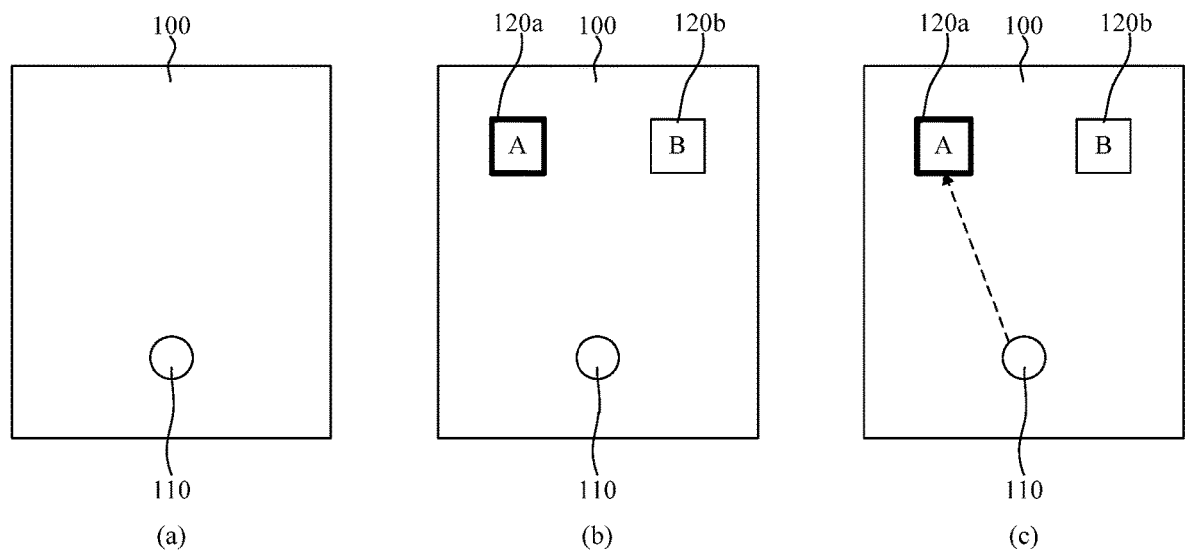
FIG. 8 is a schematic diagram of another display interface of a screen projection interaction method according to at least one embodiment of the present disclosure.

FIG. 8 is a schematic diagram of another display interface of a screen projection interaction method according to at least one embodiment of the present disclosure. In some exemplary embodiments, as shown in FIG. 8(a), the first terminal displays a second object 110 on the display interface 100 in response to the detected second operation. The second operation may include one of the following: a first screen projection wake-up gesture, a touch operation on a set position of the display interface, a long-press operation on any position of the display interface, and a touch operation on a set icon (e.g., a screen projection command icon) on the display interface. For example, the touch operation may include one of the following: a click operation, a double click operation, and a long-press operation. However, this is not limited in the present embodiment.

In some examples, the first terminal determines the projected content on the display interface in response to the second operation, and selects a recommended terminal from a plurality of second terminals that establish connection with the first terminal according to the attributes of the projected content on the display interface. The first terminal is configured with set rules. The first terminal may select the recommended terminal from a plurality of second terminals according to the attributes of the projected content with reference to the set rules. In some examples, the attributes of the projected content may include at least one of the following: file type and file size. For example, a second terminal with a smaller display screen size is selected for projected content with a picture file, and a second terminal with a larger display screen size is selected for projected content with a text file. Or, a first type of second terminal (e.g., a mobile terminal such as a tablet computer) is selected for non-editable projected content, and a second type of second terminal (e.g., a fixed terminal such as a desktop computer) is selected for editable projected content (e.g., excel file, PPT file, word file, etc.). Or, a first type of second terminal (e.g., mobile terminal such as tablet computer) is selected for projected content with small file size, and a second type of second terminal (e.g., fixed terminal such as desktop computer) is selected for projected content with large file size. In this embodiment, the determination mode, determination opportunity and display mode of the recommended terminal are not limited. For example, the first terminal may determine and display the recommended terminal in response to the first operation.

In some examples, in response to the detected first operation, the first terminal displays the first object corresponding to the recommended terminal on the display interface in a display manner different from other first objects. As shown in FIG. 8(b), the first terminal displays a plurality of first objects on the display interface 100 in response to the first operation, such as two first objects 120*a* and 120*b*, wherein the border of the first object 120*a* is displayed in bold, and is configured to indicate that the second terminal A corresponding to the first object 120*a* is a recommended terminal. However, this is not limited in the present embodiment. For example, the color of the first object 120*a* may be red or a filled pattern.

In this example, the screen projection selection operation includes a dragging operation for the second object. As shown in FIG. 8(*c*), after the first objects 120*a* and 120*b* and the second object 110 are displayed on the display interface 100, the finger may drag the second object 110 to move toward the first object 120*a*, until reaching the first object 120*a*. The dragging operation shown in FIG. 8(*c*) may trigger the first terminal to generate a first screen projection instruction, which is configured to instruct the second terminal A corresponding to the first object 120*a* to display the projected content of the first terminal. In this example, the user selects the recommended terminal as the final target terminal for screen projection. However, this is not limited in the present embodiment.

For other aspects of the screen projection interaction method of this embodiment, reference may be made to the description of the embodiment shown in FIG. 2, which hence will not be repeated here.

Figure 9:
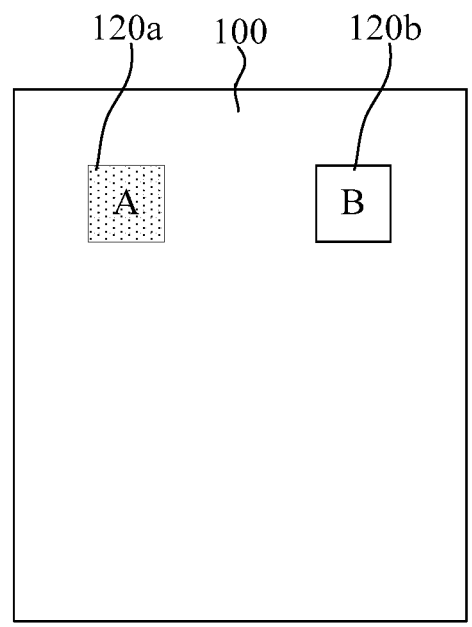
FIG. 9 is a schematic diagram of another display interface of a screen projection interaction method according to at least one embodiment of the present disclosure.

FIG. 9 is a schematic diagram of another display interface of a screen projection interaction method according to at least one embodiment of the present disclosure. In some exemplary embodiments, as shown in FIG. 9, the first terminal enters the automatic screen projection mode in response to a fourth operation at the first terminal. Wherein, the fourth operation is different from the first operation. For example, a fourth operation may include at least one of the following: a second screen projection wake-up gesture at the first terminal, and a long-press operation at a set position of the display interface of the first terminal. However, this is not limited in the present embodiment.

In some examples, in response to the fourth operation, the first terminal may select a target terminal from a plurality of second terminals connected to the first terminal according to the attributes of the projected content on the display interface, and automatically generate a second screen projection instruction configured to instruct the target terminal to display the projected content. As shown in FIG. 9, the first terminal may display a plurality of first objects, such as two first objects 120*a* and 120*b*, on the display interface 100 in response to the fourth operation. The first object 120*a* is configured to indicate a second terminal A that establishes a connection with the first terminal, and the first object 120*b* is configured to indicate a second terminal B that establishes a connection with the first terminal. Wherein, the second terminal A is the target terminal determined by the automatic matching process. On the display interface 100, the first object 120*a* corresponding to the second terminal A is filled with a pattern to distinguish it from the first object 120*b*.

In this example, a first terminal may automatically match the target terminal for screen projection by entering the automatic screen projection mode, thus saving user operation and achieving intelligent screen projection management.

Figure 10:
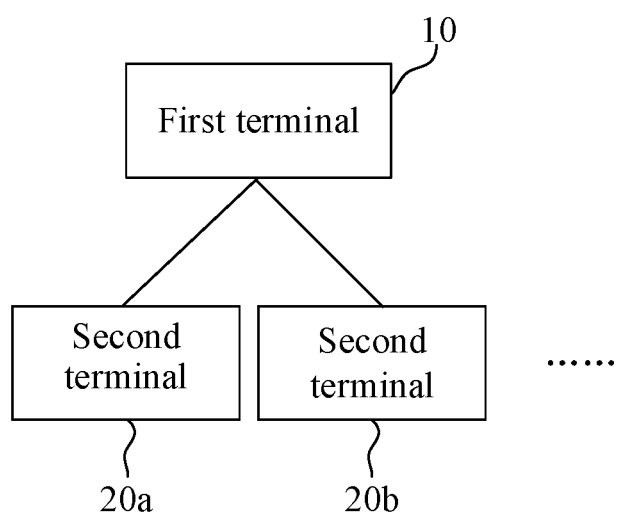
FIG. 10 is a schematic diagram of a screen projection system according to at least one embodiment of the present disclosure.

FIG. 10 is a schematic diagram of a screen projection system according to at least one embodiment of the present disclosure. As shown in FIG. 10, the screen projection system of this exemplary embodiment may include a first terminal 10 and a plurality of second terminals (illustrated by taking two second terminals 20*a* and 20*b* as an example). The first terminal 10 may establish connection with a plurality of second terminals in a wireless manner (e.g., WIFI, Bluetooth, etc.) or a wired manner. The first terminal 10 is configured to display a plurality of first objects on a display interface in response to the detected first operation, and generate a first screen projection instruction in response to the detected screen projection selection operation on the display interface. Wherein, the plurality of first objects are configured to indicate a plurality of second terminals which are connected to the first terminal 10, the projection selection operation is configured to select a target object from the plurality of first objects, and the first screen projection instruction is configured to instruct a second terminal corresponding to the target object to display projected content.

In some examples, after the first terminal 10 generates the first screen projection instruction, it may send the first screen projection instruction to the second terminal corresponding to the selected target object, and the first screen projection instruction may carry the storage address of the projected content. After receiving the first screen projection instruction, the second terminal acquires the projected content according to the information carried by the first screen projection instruction to display the projected content. However, this is not limited in the present embodiment.

Figure 11:
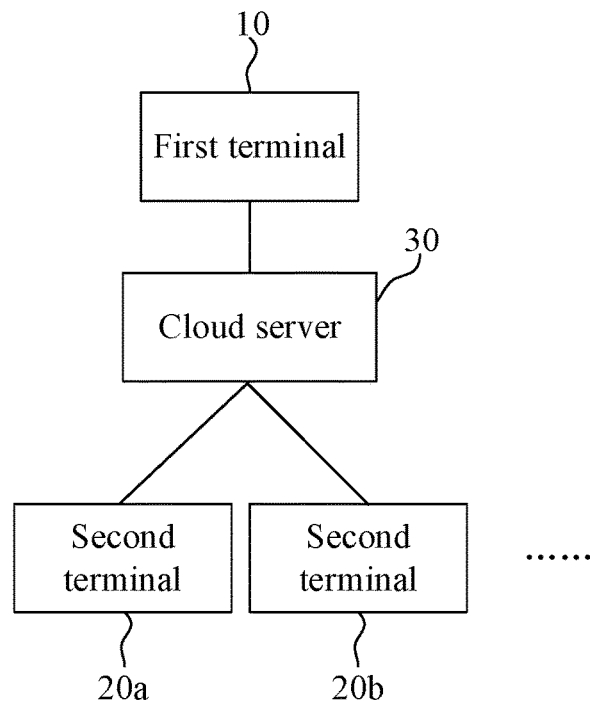
FIG. 11 is another schematic diagram of a screen projection system according to at least one embodiment of the present disclosure.

FIG. 11 is another schematic diagram of a screen projection system according to at least one embodiment of the present disclosure. As shown in FIG. 11, the screen projection system of this exemplary embodiment may include a first terminal 10 and a plurality of second terminals (illustrated by taking two second terminals 20*a* and 20*b* as an example), and a cloud server 30. The first terminal 10 establishes communication connection with the plurality of second terminals through the cloud server 30. The first terminal 10 and a plurality of second terminals may be connected to a cloud server through a wireless network. For example, the first terminal 10 may be a portable terminal device such as a smart phone, and the second terminals 20*a* and 20*b* may be portable terminal devices such as a tablet computer, or fixed terminal devices such as a desktop computer. However, this is not limited in the present embodiment.

In some exemplary embodiments, the cloud server 30 allocates storage space to the connected first terminal 10 and second terminals 20*a* and 20*b*. For example, the first terminal 10 is allocated a first storage space, each second terminal is allocated a second storage space, and the cloud server 30 is also constructed with a shared storage space. The first terminal and each second terminal may access their own storage space and share the storage space. In some examples, when the first terminal 10 is triggered to generate the first screen projection instruction, the first terminal 10 will transfer the projected content in the first storage space to the shared storage space and send the first screen projection instruction to the target terminal (for example, the second terminal 20*a*). After receiving the first screen projection instruction, the second terminal 20*a* as the target terminal may parse the first screen projection instruction and obtain the authorization information, and read the corresponding projected content from the shared storage space for display. The second terminal 20*a* reads the projected content from the shared storage space, and may operate (e.g., modify) the projected content only in the shared storage space, but cannot save the projected content locally or in the corresponding second storage space. In other words, the second terminal 20*a* modifies the projected content, and the modified projected content is still stored in the shared storage space. After the first terminal 10 exits the screen projection mode, the cloud server may transfer the updated projected content stored in the public storage space to the first storage space corresponding to the first terminal for storage. In this example, the second terminal, as the screen projection terminal, may read and operate the projected content, but does not have the saving authority, which may improve the data security in the screen projection process.

In some exemplary embodiments, at least one second terminal is configured to generate a third screen projection instruction in response to a screen projection operation detected on a second terminal when displaying the projected content of a first terminal, and the third screen projection instruction is configured to instruct another second terminal to display the projected content. As shown in FIG. 11, the second terminal 20a may generate a third screen projection instruction in response to the detected screen projection operation when displaying the projected content of the first terminal 10, and the third screen projection instruction is configured to instruct the second terminal 20b to display the projected content. In other words, the projected content on the second terminal 20a is directly projected to the second terminal 20b without performing a plurality of operations on the first terminal (for example, exiting the screen projection of the second terminal 20a, entering the screen projection of the second terminal 20b, etc.). In some examples, the second terminal 20a only has the authority to display the projected content of the first terminal 10, so when the projected content needs to be modified, the projected content may be directly projected at the second terminal 20a to the second terminal 20b with the modification authority. In this exemplary embodiment, through the interaction between a plurality of second terminals, the operation on the first terminal may be reduced, thereby improving the user experience.

With regard to the screen projection operation on the first terminal and the second terminal in this embodiment, reference may be made to the description of the previous embodiment and will not be further illustrated here.

At least one embodiment of the disclosure further provides a terminal device, which includes a display panel, an input device, a processor and a memory. The display panel is connected to the processor and is adapted to provide a display interface; the input device is connected to the processor and is adapted to detect the operation for the terminal device; the memory is adapted to store a computer program which, when executed by the processor, implements the steps of the aforementioned screen projection interaction method.

Figure 12:
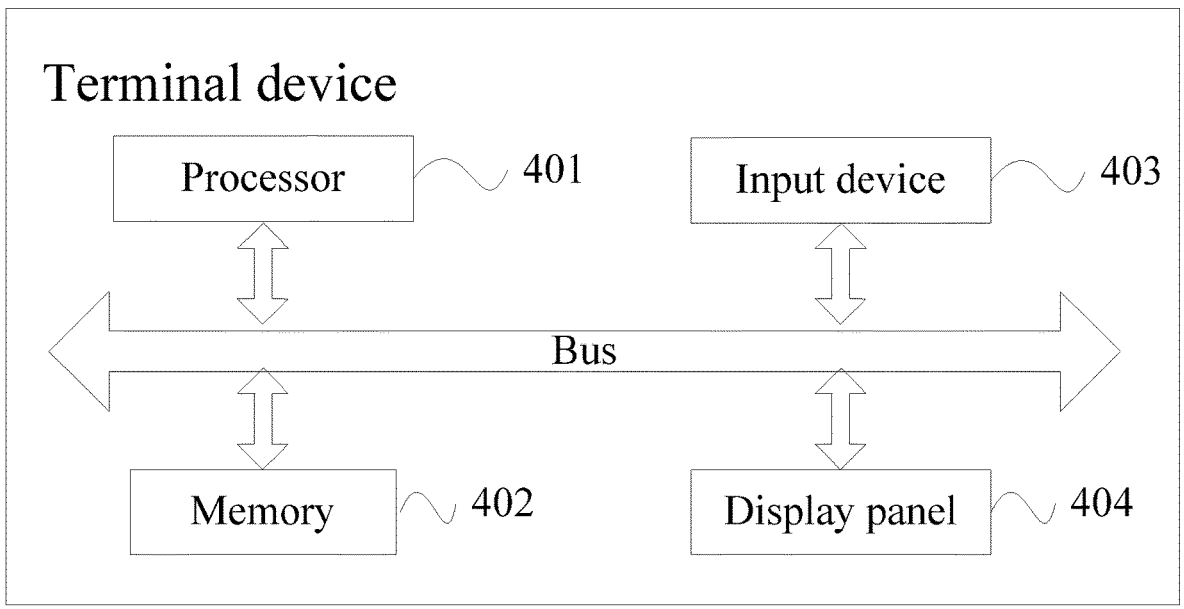
FIG. 12 is a schematic diagram of a terminal device according to at least one embodiment of the present disclosure.

FIG. 12 is a schematic diagram of a terminal device according to at least one embodiment of the present disclosure. As shown in FIG. 12, the terminal device provided in this embodiment (for example, a smart phone, a tablet computer, etc.) includes a processor 401, a memory 402, a display panel 404 and an input device 403. The processor 401, the memory 402, the input device 403 and the display panel 404 are connected by a bus. The display panel 404 is adapted to provide a display interface; the input device 403 is adapted to detect an operation on the terminal device; the memory 402 is adapted to store a computer program which, when executed by the processor 401, implements the steps of the screen projection interaction method provided by the above embodiment.

In some examples, a structure of the terminal device shown in FIG. 12 does not constitute a limitation on the terminal device, and may include more or fewer components than shown, or combine some components, or provide different component arrangements.

In some examples, the processor 401 may include, but is not limited to, a processing apparatus such as a Microcontroller Unit (MCU) or a Programmable logic device such as a Field Programmable Gate Array (FPGA). The memory 402 may store software programs and modules of application software, such as program instructions or modules corresponding to the screen projection interaction method according to this embodiment. The processor 401 executes various functional applications and data processing, for example, implements the screen projection interaction method according to this embodiment, by running the software programs and modules stored in the memory 402. The memory 402 may include a high-speed random access memory, and may also include a non-volatile memory such as one or more magnetic storage apparatuses, flash memory, or other non-volatile solid-state memory. In some examples, the memory 402 may include memories remotely located with respect to the processor 401, and these remote memories may be connected to the terminal device through a network. Examples of the above network include, but are not limited to, the Internet, the intranet, a local area network, a mobile communication network and combinations thereof.

In some examples, the input device 403 may be adapted to receive input information. For example, the input device 403 may include a touch panel (or touch screen) and other input devices (such as a mouse, a keyboard, a joystick, etc.). The display panel 404 may be adapted to display information input by the user or information provided to the user. The display panel 404 is, for example, a liquid crystal display, an organic light-emitting diode display panel, and the like. For example, a touch panel may overlay on a display panel, and when the touch panel detects a touch operation thereon or nearby, the touch panel transmits the touch operation to the processor 401 to determine a type of the touch event, and then the processor 401 provides corresponding visual output on the display panel according to the type of touch event. For example, the touch panel and the display panel may be used as two independent components to implement input and output functions of the terminal device, or the touch panel and the display panel may be integrated together to implement the input and output functions. However, this is not limited in the present embodiment.

In addition, at least one embodiment of the present disclosure further provides a computer-readable storage medium, storing a computer program, wherein when the computer program is executed by a processor; acts of the above method for implementing screen projection interaction are performed.

Those of ordinary skill in the art may understand that all or some of the acts in the method, the system, and functional modules or units in the device disclosed above may be implemented as software, firmware, hardware, and an appropriate combination thereof. In a hardware implementation, the division between functional modules or units mentioned in the above description does not necessarily correspond to the division of physical components. For example, a physical component may have plurality of functions, or a function or an act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium), and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage or another magnetic storage device, or any other medium that may be used for storing desired information and may be accessed by a computer. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

The above shows and describes the basic principles, main features and advantages of the present disclosure. This disclosure is not limited by the above embodiments. The above embodiments and descriptions only illustrate the principles of the present disclosure. Without departing from the essence and scope of the present disclosure, various changes and improvements in the disclosure may be made, all of which fall within the protection scope of the claims of the present disclosure.

What is claimed is:

1. A screen projection interaction method, comprising:
   displaying a plurality of first objects on a display interface of a first terminal in response to a first operation detected by the first terminal, wherein the plurality of first objects is configured to indicate a plurality of second terminals which are connected to the first terminal;
   generating a first screen projection instruction in response to a screen projection selection operation detected on the display interface of the first terminal, wherein the screen projection selection operation is configured to select a target object from the plurality of first objects and generate a dragging operation for a second object of a plurality of second objects, wherein the plurality of second objects is displayed together with the plurality of first objects, wherein the first screen projection instruction is configured to instruct a second terminal of the plurality of second terminals corresponding to the target object to display a respective projected content indicated by the second object; wherein each of the plurality of second objects indicates a respective different projected contents-content on the display interface of the first terminal, wherein each of the plurality of second objects is draggable to generate the first screen projection instruction;
   before generating the first screen projection instruction and in response to the screen projection selection operation, selecting a recommended terminal from the plurality of second terminals connected to the first terminal according to attributes of the projected content associated with the second object on the display interface, and displaying an object of the plurality of first objects corresponding to the recommended terminal on the display interface in a display manner different from objects of the plurality of first objects corresponding to terminals other than the recommended terminal; and
   in response to a received screen projection success instruction, the second object corresponding to successfully projected content is no longer displayed on the display interface of the first terminal; wherein the screen projection success instruction is configured to indicate projected content indicated by the second object is successfully displayed on the second terminal corresponding to the target object.

2. The method of claim 1, wherein the screen projection selection operation comprises a sliding operation on the display interface, or a dragging operation for projected contents on the display interface.

3. The method of claim 2, wherein generating the first screen projection instruction in response to the screen projection selection operation detected on the display interface of the first terminal, comprises:
   selecting a first object corresponding to an end position of the sliding operation as the target object in a case that the sliding operation on the display interface ends at a position where one of the first objects is located, and generating the first screen projection instruction;
   or, in a case that projected content on the display interface moves to a position of one of the first objects following the dragging operation and ends the movement, selecting a first object corresponding to an ending position of the projected content as the target object to generate the first screen projection instruction;
   or, in a case that projected content on the display interface moves to an end position following the dragging operation, selecting a first object closest to the end position of the projected content as the target object to generate the first screen projection instruction.

4. The method of claim 1, further comprising: displaying the plurality of second objects on the display interface of the first terminal in response to the first operation detected by the first terminal;
   or, before displaying the plurality of first objects on the display interface of the first terminal, displaying the plurality of second objects on the display interface in response to a second operation detected on the display interface of the first terminal;
   or, after displaying the plurality of first objects on the display interface of the first terminal, displaying the plurality of second objects on the display interface in response to a third operation detected on the display interface of the first terminal.

5. The method of claim 4, wherein generating the first screen projection instruction in response to the screen projection selection operation detected on the display interface of the first terminal, comprises:
   in a case that the one of the plurality of second objects moves to a position where one of the first objects is located following the dragging operation and ends the movement, selecting a first object corresponding to an end position of the one of the plurality of second objects as a target object to generate the first screen projection instruction;
   or, in a case that the one of the plurality of second objects moves to an end position following the dragging operation, selecting a first object closest to the end position of the one of the plurality of second objects as a target object and generating the first screen projection instruction.

6. The method of claim 5, wherein each of the plurality of second objects comprises a floating box or a thumbnail of projected content.

7. The method of claim 5, wherein the first operation comprises at least one of a first screen projection wake-up gesture of the first terminal, a touch operation at a set position of the display interface of the first terminal, a long-press operation at any position of the display interface of the first terminal, and a touch operation on one of the plurality of second objects displayed on the display interface.

8. The method of claim 4, wherein each of the plurality of second objects comprises a floating box, or a thumbnail of projected content.

9. The method of claim 4, wherein the first operation comprises at least one of a first screen projection wake-up gesture of the first terminal, a touch operation at a set position of the display interface of the first terminal, a long-press operation at any position of the display interface of the first terminal, and a touch operation on one of the plurality of second objects displayed on the display interface.

10. The method of claim 1, wherein the plurality of first objects is displayed at set positions of the display interface of the first terminal; or, a display position of at least one first object on the display interface matches a position of a respective terminal of the plurality of second terminals corresponding to the first object relative to the first terminal.

11. The method of claim 1, further comprising: displaying the target object on the display interface of the first terminal in a display manner different from the first objects except the target object in response to the received screen projection success instruction, wherein the screen projection success instruction is configured to indicate that the second terminal corresponding to the target object successfully displays the screen projection content.

12. The method of claim 1, further comprising: selecting a target terminal from the plurality of second terminals connected to the first terminal according to attributes of the projected content on the display interface in response to a fourth operation detected by the first terminal, and generating a second screen projection instruction, which is configured to instruct the target terminal to display the projected content.

13. The method of claim 12, wherein after the second screen projection instruction is generated, the method further comprises: displaying the plurality of first objects for indicating the plurality of second terminals on the display interface, and a display manner of a first object corresponding to the target terminal is different from a display manner of other first objects.

14. The method of claim 1, wherein the first terminal and the plurality of second terminals establish communication connections through a cloud server.

15. A screen projection system, comprising: a first terminal and a plurality of second terminals, wherein the first terminal establishes connections with the plurality of second terminals;
the first terminal is configured to display a plurality of first objects on a display interface in response to a detected first operation, and generate a first screen projection instruction in response to a screen projection selection operation detected on the display interface;
wherein the plurality of first objects is configured to indicate the plurality of second terminals which are connected to the first terminal, the screen projection selection operation is configured to select a target object from the plurality of first objects and generate a dragging operation for a second object of a plurality of second objects, wherein the plurality of second objects is displayed together with the plurality of first objects; wherein the first screen projection instruction is configured to instruct a second terminal of the plurality of second terminals corresponding to the target object to display a respective projected content indicated by the second object; wherein each of the plurality of second objects indicates a respective different projected content on the display interface of the first terminal, wherein each of the plurality of second objects is draggable to generate the first screen projection instruction;
before generating the first screen projection instruction and in response to the screen projection selection operation, selecting a recommended terminal from the plurality of second terminals connected to the first terminal according to attributes of the projected content associated with the second object on the display interface, and displaying an object of the plurality of first objects corresponding to the recommended terminal on the display interface in a display manner different from objects of the plurality of first objects corresponding to terminals other than the recommended terminal; and
in response to a received screen projection success instruction, the second object corresponding to successfully projected content is no longer displayed on the display interface of the first terminal; wherein the screen projection success instruction is configured to indicate projected content indicated by the second object is successfully displayed on the second terminal corresponding to the target object.

16. The system of claim 15, further comprising a cloud server, wherein the first terminal establishes communication connections with the plurality of second terminals through the cloud server.

17. A terminal device, comprising: a display panel, an input device, a processor and a memory; wherein the display panel is connected to the processor and is configured to provide a display interface; wherein the input device is connected to the processor and is adapted to detect operations on the terminal device; wherein the memory is configured to store a computer program that, when executed by the processor, causes the processor to:
display a plurality of first objects on the display interface in response to a first operation detected by the first terminal, wherein the plurality of first objects is configured to indicate a plurality of second terminals which are connected to the first terminal;
generating a first screen projection instruction in response to a screen projection selection operation detected by the input device of the first terminal, wherein the screen projection selection operation is configured to select a target object from the plurality of first objects and generate a dragging operation for a second object of a plurality of second objects, wherein the plurality of second objects is displayed together with the plurality of first objects, where in the first screen projection instruction is configured to instruct a second terminal of the plurality of second terminals corresponding to the target object to display a respective projected content indicated by the second object; wherein each of the plurality of second objects indicates a respective different projected content on the display interface of the first terminal, wherein each of the plurality of second objects is draggable to generate the first screen projection instruction;
before generating the first screen projection instruction and in response to the screen projection selection operation, selecting a recommended terminal from the plurality of second terminals connected to the first terminal according to attributes of the projected content associated with the second object on the display interface, and displaying an object of the plurality of first objects corresponding to the recommended terminal on the display interface in a display manner different from objects of the plurality of first objects corresponding to terminals other than the recommended terminal; and in response to a received screen projection success instruction, the second object corresponding to successfully projected content is no longer displayed on the display interface of the first terminal; wherein the screen projection success instruction is configured to indicate projected content indicated by the second object is successfully displayed on the second terminal corresponding to the target object.

18. A non-transitory computer-readable storage medium storing a computer program that, when executed by a processor, causes the processor to:

display a plurality of first objects on the display interface in response to a first operation detected by the first terminal, wherein the plurality of first objects is configured to indicate a plurality of second terminals which are connected to the first terminal;

generating a first screen projection instruction in response to a screen projection selection operation detected by the input device of the first terminal, wherein the screen projection selection operation is configured to select a target object from the plurality of first objects and generate a dragging operation for a second object of a plurality of second objects, wherein the plurality of second objects is displayed together with the plurality of first objects, wherein the first screen projection instruction is configured to instruct a second terminal of the plurality of second terminals corresponding to the target object to display a respective projected content indicated by the second object; wherein each of the plurality of second objects indicates a respective different projected content on the display interface of the first terminal, wherein each of the plurality of second objects is draggable to generate the first screen projection instruction;

before generating the first screen projection instruction and in response to the screen projection selection operation, selecting a recommended terminal from the plurality of second terminals connected to the first terminal according to attributes of the projected content associated with the second object on the display interface, and displaying an object of the plurality of first objects corresponding to the recommended terminal on the display interface in a display manner different from objects of the plurality of first objects corresponding to terminals other than the recommended terminal; and in response to a received screen projection success instruction, the second object corresponding to successfully projected content is no longer displayed on the display interface of the first terminal; wherein the screen projection success instruction is configured to indicate projected content indicated by the second object is successfully displayed on the second terminal corresponding to the target object.

* * * * *